(12) United States Patent
Scott et al.

(10) Patent No.: US 7,249,778 B2
(45) Date of Patent: Jul. 31, 2007

(54) VEHICLE

(75) Inventors: David K Scott, Fielding (NZ); Thomas R Jackman, Palmerston North (NZ)

(73) Assignee: Flexibility Concepts, Ltd., Palmerston North (NZ)

(*) Notice: Subject to any disclaimer, the term of this patent is extended or adjusted under 35 U.S.C. 154(b) by 105 days.

(21) Appl. No.: 11/022,015

(22) Filed: Dec. 23, 2004

(65) Prior Publication Data

US 2005/0194757 A1    Sep. 8, 2005

(30) Foreign Application Priority Data

Mar. 4, 2004    (NZ) .................................. 531540

(51) Int. Cl.
*B62K 5/08*    (2006.01)

(52) U.S. Cl. ....................... 280/266; 280/282

(58) Field of Classification Search ............. 280/263, 280/282, 293, 296
See application file for complete search history.

(56) References Cited

U.S. PATENT DOCUMENTS

| | | | |
|---|---|---|---|
| 1,056,357 A * | 3/1913 | Murdock ............... | 280/87.042 |
| 1,652,284 A | 12/1927 | Madsen | |
| 2,641,480 A | 6/1953 | Bancroft | |
| 3,096,100 A * | 7/1963 | Clarke et al. ........... | 280/261 |
| 3,504,934 A * | 4/1970 | Wallis ................... | 280/282 |
| 3,828,876 A | 8/1974 | Morelli | |
| 3,857,583 A | 12/1974 | Vanover | |
| 4,022,382 A | 5/1977 | Engdahl, Jr. | |
| 4,077,533 A | 3/1978 | Meyer | |
| 4,248,442 A | 2/1981 | Barrett | |
| 4,255,823 A | 3/1981 | Boyer et al. | |
| 4,279,429 A * | 7/1981 | Hopkins et al. ......... | 280/267 |
| 4,281,844 A * | 8/1981 | Jackman et al. ......... | 280/282 |
| 4,341,381 A | 7/1982 | Norberg | |
| 4,396,069 A | 8/1983 | Ferber et al. | |
| 4,510,633 A | 4/1985 | Thorne | |
| 4,545,531 A | 10/1985 | Williams | |
| 4,570,965 A | 2/1986 | Caswell | |
| 4,633,538 A | 1/1987 | James | |
| 4,647,054 A | 3/1987 | Chong | |

(Continued)

FOREIGN PATENT DOCUMENTS

GB    2 008 045    5/1979

OTHER PUBLICATIONS

Certified Copy of Priority Document, New Zealand Patent Application No. 405158, filed Aug. 11, 2004, (6 pages).

(Continued)

*Primary Examiner*—Kevin Hurley
(74) *Attorney, Agent, or Firm*—Harness, Dickey & Pierce, P.L.C.

(57) ABSTRACT

A vehicle includes a load-bearing body having a front end and a rear end, at least one carrier supporting the body on a surface on which the vehicle is positioned, and a steering device. The steering device includes at least one wheel and at least one castor-type wheel attached to the body and tiltable about a longitudinal axis of the body. In use, the at least one wheel and the at least one castor-type wheel contact a support surface and the vehicle is steerable by tilting the at least one castor-type wheel and the at least one wheel about the longitudinal axis.

22 Claims, 4 Drawing Sheets

U.S. PATENT DOCUMENTS

| | | | |
|---|---|---|---|
| 4,830,567 | A | 5/1989 | Rachman |
| 4,867,188 | A | 9/1989 | Reid |
| 4,914,894 | A | 4/1990 | Geiger |
| 5,064,209 | A | 11/1991 | Kurschat |
| 5,071,150 | A * | 12/1991 | Conrad ........................ 280/264 |
| 5,129,708 | A | 7/1992 | Swan |
| 5,167,597 | A * | 12/1992 | David .......................... 482/68 |
| 5,398,361 | A | 3/1995 | Cason |
| 5,421,318 | A | 6/1995 | Unruh et al. |
| 5,458,305 | A | 10/1995 | Woodward |
| D368,680 | S | 4/1996 | Freeman |
| 5,730,453 | A * | 3/1998 | Owsen ........................ 280/282 |
| 5,918,452 | A | 7/1999 | Kelderman |
| 5,941,548 | A * | 8/1999 | Owsen ........................ 280/282 |
| 5,944,131 | A | 8/1999 | Schaffner et al. |
| 6,178,965 | B1 | 1/2001 | Sulak |
| 6,199,647 | B1 | 3/2001 | Schaffner et al. |
| 6,199,826 | B1 | 3/2001 | Nix |
| 6,286,695 | B1 | 9/2001 | Tetreault |
| 6,406,250 | B2 | 6/2002 | Jaeger et al. |
| 6,422,504 | B1 | 7/2002 | Elder |
| 6,449,933 | B1 | 9/2002 | Umemoto et al. |
| 6,516,597 | B1 | 2/2003 | Samejima et al. |
| 6,533,260 | B1 | 3/2003 | Mock |
| 6,572,130 | B2 * | 6/2003 | Greene et al. .............. 280/282 |
| 6,634,658 | B2 | 10/2003 | Larouche |
| 6,726,046 | B2 | 4/2004 | Orset |
| 6,783,147 | B1 | 8/2004 | Green, Sr. |
| 6,832,580 | B2 | 12/2004 | Marchioro |
| 7,014,198 | B2 | 3/2006 | Everitt et al. |
| 7,025,421 | B1 | 4/2006 | Fowler et al. |
| 2004/0036253 | A1 * | 2/2004 | Cheng ........................ 280/293 |

OTHER PUBLICATIONS

U.S. Design Application 29/223,229, filed Feb. 10, 2005.

* cited by examiner

VEHICLE

CROSS-REFERENCE TO RELATED APPLICATION

This application claims priority to New Zealand Patent Application No. NZ531540, filed Mar. 4, 2004, the entire disclosure of which is incorporated herein by reference.

FIELD OF THE INVENTION

The present invention generally relates to a vehicle, and more particularly (but not exclusively) to a vehicle with an improved steering device.

BACKGROUND OF THE INVENTION

Castor-type wheels are used on many vehicles such as shopping trolleys, mobile storage units and hospital beds. But these existing vehicles can be difficult to steer because the castor-type wheel is fixed in a vertical position. Furthermore, where a vehicle includes more than one castor-type wheel, it can be difficult to turn all the castor-type wheels in the same direction, making it difficult to steer the vehicle.

SUMMARY OF THE INVENTION

According to one aspect of the present invention, a vehicle includes a load-bearing body having a front end and a rear end, at least one carrier supporting the body on a surface on which the vehicle is positioned, and a steering device. The steering device includes at least one wheel and at least one castor-type wheel attached to the body and tiltable about a longitudinal axis of the body. In use, the at least one wheel and the at least one castor-type wheel contact a support surface and the vehicle is steerable by tilting the at least one castor-type wheel and the at least one wheel about the longitudinal axis.

Further aspects and features of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of exemplary embodiments is merely exemplary in nature and is in no way intended to limit the invention, its applications, or uses.

As used herein, the term "vehicle" refers to and includes devices for carrying people and transporting people and any device which may be placed on carriers to be moved. The exemplary embodiments of the present invention are provided to expound, and not limit, the meaning of the term "vehicle".

Figure 1:
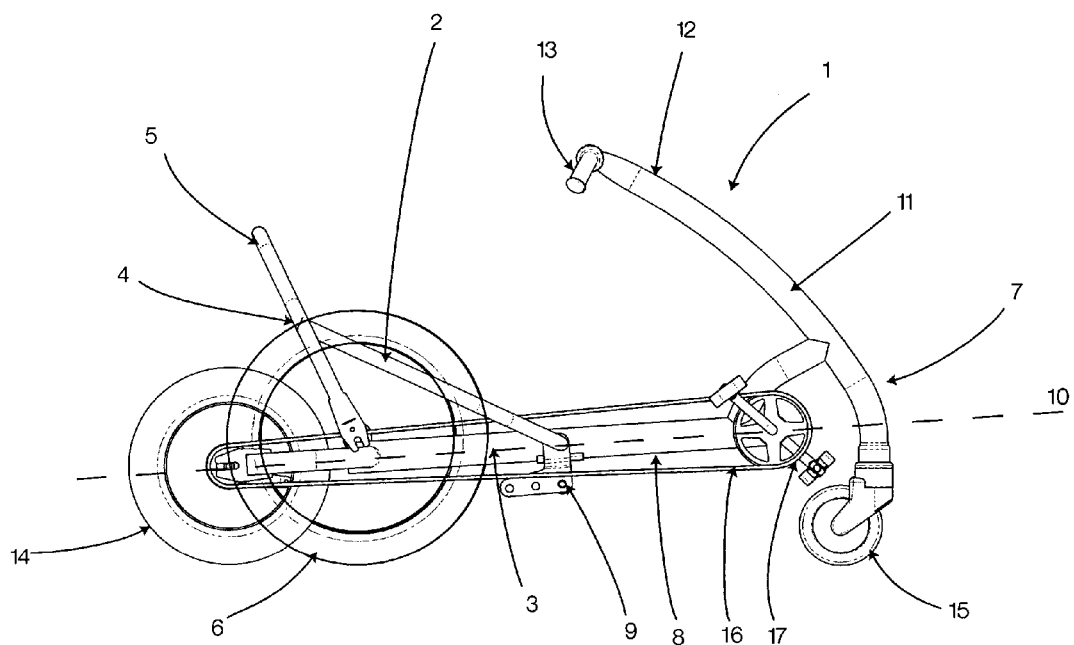
FIG. 1 is a side view of a vehicle according to one exemplary embodiment of the invention.
Figure 2:
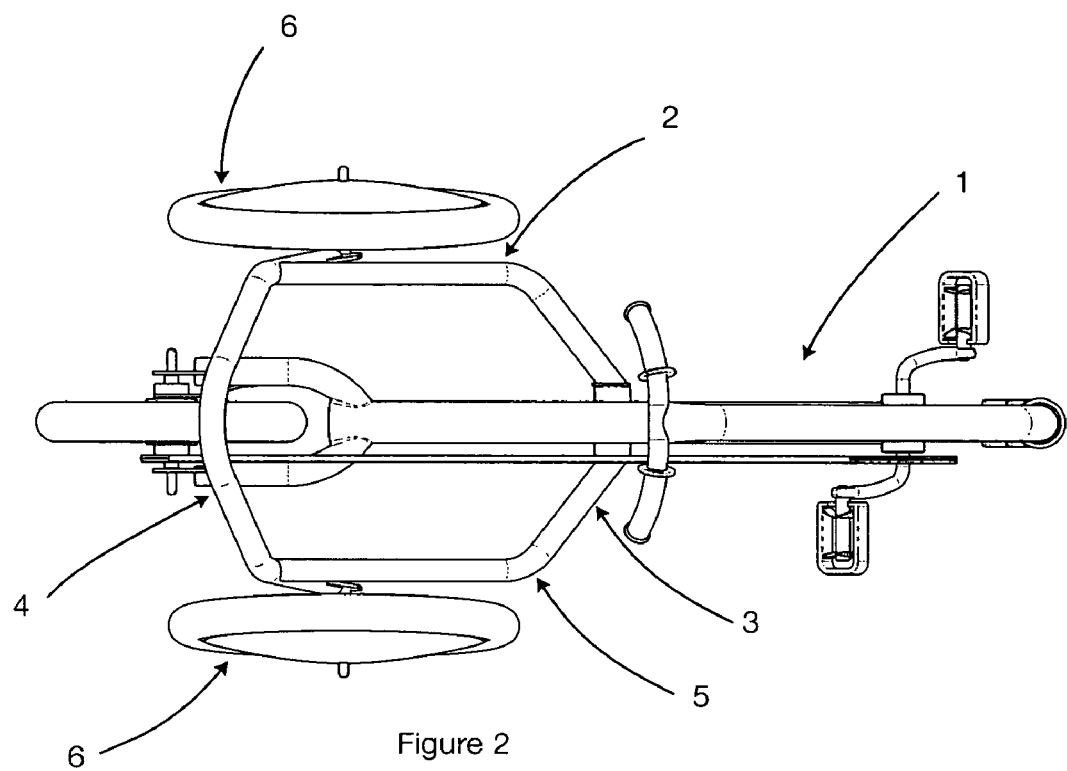
FIG. 2 is a top plan view of the vehicle shown in FIG. 1.

FIGS. 1 and 2 illustrate an exemplary vehicle 1 in accordance with the principles of this invention. As shown, the vehicle 1 includes a load-bearing body 2 having a front end 3 and a rear end 4. The load-bearing body 2 is illustrated as a frame 5 which can support a seat (not shown) for carrying a passenger. Any suitable load-bearing body, however, can be used including a flat surface for carrying goods.

The load-bearing body 2 is supported by at least one carrier 6. The carrier 6 is illustrated as two rotatable wheels, although any suitable carrier can be used, such as a caterpillar track. Furthermore, the carrier is not necessarily rotatable and can include fixed carriers such as a ski foot.

Figure 3:
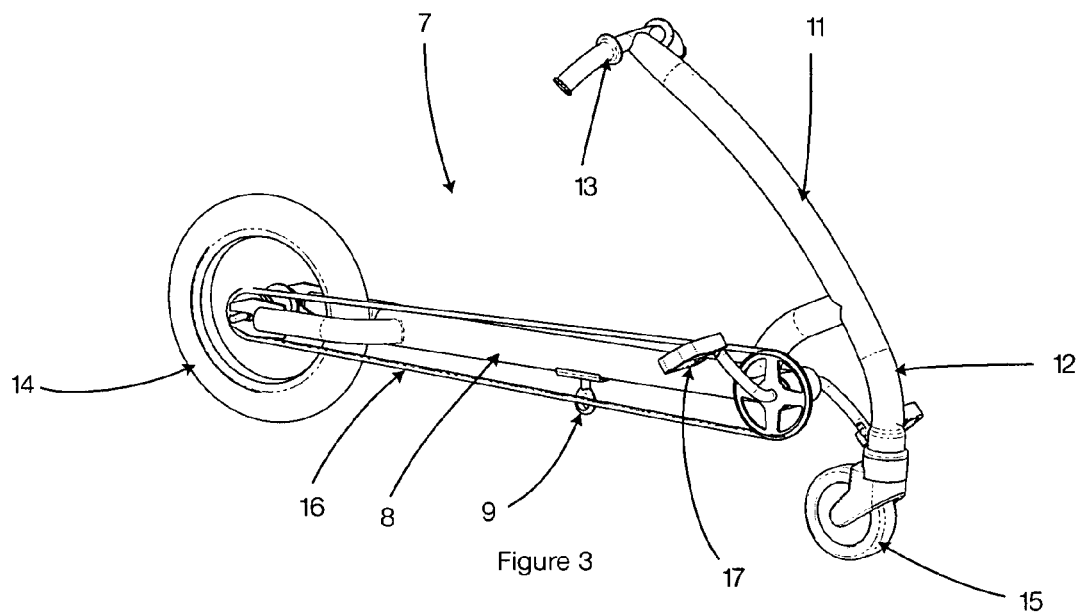
FIG. 3 is a perspective view of a steering device according to one exemplary embodiment of the invention which may be used in the vehicle shown in FIG. 1.

In the embodiment illustrated in FIGS. 1 and 3, the vehicle 1 includes a steering device 7. The steering device 7 includes a longitudinal shaft 8 attached to the load-bearing body 2 via a joint 9. The joint 9 is illustrated as a rose joint which allows the steering device 7 to move vertically up and down with respect to the load-bearing body 2. This provides suspension for the load-bearing body 2 absorbing shock when the vehicle 1 travels over rough terrain, thereby helping to stabilize the vehicle 1. The joint 9 also allow the shaft 8 to rotate about the longitudinal axis 10 of the vehicle 1.

A handle 11 is attached to the shaft 8 to rotate the shaft 8 about the longitudinal axis 10. In the illustrated embodiment, the handle 11 is proximate the front of the vehicle 1 so that it can be operated by a passenger (not shown). Alternatively, the handle 11 can also be positioned at the rear of the vehicle 1 so that it may be operated by a person from behind the vehicle 1. This alternative arrangement can could be used, for example, when the vehicle 1 is a trolley for carrying goods.

The handle 11 is illustrated as a generally upwardly extending shaft 12 including a cross-bar 13 proximate the upper end of the upwardly extending shaft 12. Alternatively, the other handles can be used such as a joystick or a steering wheel.

The steering device 7 also includes a wheel 14 and castor-type wheel 15. In the illustrated embodiment, the wheel 14 is attached to the shaft 8, and the castor-type wheel 15 is attached to the handle 11. In other embodiments, however, the castor-type wheel 15 may be attached to the shaft 8. In the alternative embodiments in which the handle 11 is attached near the rear of the vehicle 1, the wheel 14 may be attached to the handle 11 or the shaft 8, and the castor-type wheel 15 can be attached to the shaft 8.

The steering device 7 is illustrated with the wheel 14 and the castor-type wheel 15 along the longitudinal axis 10 of the vehicle 1. It will be appreciated, however, that the relative position of the wheel 14 and the castor-type wheel 15 can be varied without departing from the spirit and scope of the invention.

As shown, the two rotatable carriers 6 and the wheel 14 are proximate the rear end 4 of the load-bearing body 2, and the castor-type wheel 15 is proximate the front end 3 of the load-bearing body 2. In an alternative embodiment, however, the two rotatable carriers 6 and the wheel 14 are proximate the front end 3 of the load-bearing body 2, and the castor-type wheel 15 is proximate the rear end 4 of the load-bearing body 2. In some embodiments, the two rotatable carriers 6 and the castor-type wheel 15 are in a T-shaped arrangement.

The vehicle 1 may optionally include a propulsion system or means 16. The propulsion means 16 is illustrated as a crank and chain 17 assembly. Alternatively, however, any suitable propulsion means may be used including a motor, a jigger, and other chain and crank arrangements.

In various embodiments, the propulsion means 16 drives the wheel 14. Further, the propulsion means 16 is preferably operable by a passenger in the seat.

Figure 4:
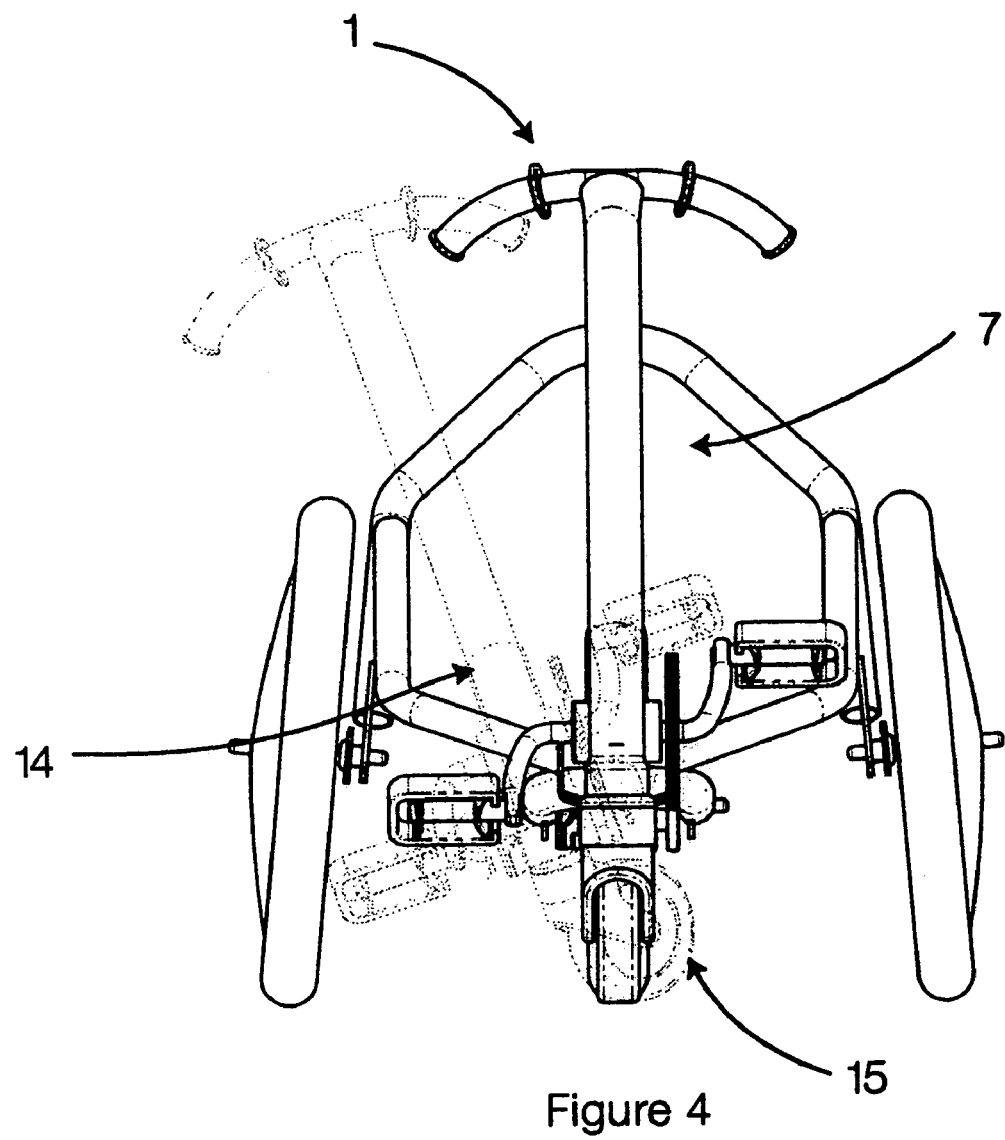
FIG. 4 is a front plan view of the vehicle shown in embodiment of the invention shown in FIG. 1.

With reference to FIG. 4, when the longitudinal shaft 8 is rotated about the longitudinal axis 10, the wheel 14 and the castor-type wheel 15 are tilted in the same direction about the longitudinal axis 10, the wheel 14 and castor-type wheel 15 tilt with respect to the support surface 16, and the castor-type wheel 15 turns as shown in the dotted lines steering the vehicle 1.

The vehicle 1 is illustrated with the castor-type wheel 15 supporting the vehicle 1. But the wheel 14 and/or the castor-type wheel 15 may or may not support the vehicle 1 depending on the particular arrangement of the carriers 6.

It is not necessary that the vehicle 1 should in fact be operated on three wheels, as the vehicle could alternatively be operated on two wheels for such articles as scooters. Further embodiments can include a four wheel vehicle having two castor-type wheels whose axes are connected by a linkage so that they can be tilted together.

Accordingly, various embodiments of the present invention provide a vehicle having improved steering capabilities as compared to some existing vehicles having one or more castor-type wheels in a vertical position. Various embodiments also provide improved steering as compared to some existing vehicles that have more than one castor-type wheel wherein it can be difficult to turn all the castor-type wheels in the same direction, making it difficult to steer the vehicle.

The teachings of the present invention can be applied in a wide range of applications that are too numerous to mention in detail. For purposes of illustration only, however, various exemplary applications will be provided. Exemplary industrial applications include mobile benches, hospital trolleys and stretchers, instrument and general tool trolleys, invalid carriages, motorized trolleys, executive chairs, moveable filing cabinets and roll pallets. In the home, exemplary embodiments of the invention can be used for television stands, carpet sweepers and shampooers, moveable beds, coffee tables, tea trolleys, hostess trolleys, storage units, moveable wardrobes, do-it-yourself (DIY) moveable scaffolding, decorating units and runners for positioning under articles of furniture such as cookers, fridges, washing machines etc. In the garden, exemplary embodiments of the invention can be applied to lawn mowers, work trolleys, water carriers, rubbish containers and cultivators. For toys, exemplary embodiments of the invention can be applied to scooters, baby walkers, and other mobile toys such as horses, tricycles, carts, etc., dolls prams, toboggans etc. Embodiments of the present invention have further applications such as in golf trolleys, moveable car jacks, car work trolleys, push chairs or baby carriages, vehicle trailers, laundry containers etc. Accordingly, the above applications are by no means an exhaustive list, as the teachings and principles of the present invention can be applied, in general, to any vehicle.

Where in the foregoing description, reference has been made to integers or components having known equivalents, those equivalents are herein incorporated as if individually set forth.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle comprising:
    a load-bearing body having a front end and a rear end;
    at least one carrier supporting the body on a surface on which the vehicle is positioned; and
    a steering device including at least one wheel and at least one castor wheel tiltable about a longitudinal axis of the body, such that in use, the at least one wheel and the at least one castor wheel contact a support surface and the vehicle is steerable by tilting the at least one castor wheel and the at least one wheel about the longitudinal axis.

2. The vehicle according to claim 1, wherein the steering device includes one wheel and one castor wheel.

3. The vehicle according to claim 1, wherein the at least one carrier includes two rotatable carriers.

4. The vehicle according to claim 3, wherein the two rotatable carriers and the wheel are proximate the rear end of the body and the castor wheel is proximate the front end of the body.

5. The vehicle according to claim 3, wherein the two rotatable carriers and the wheel are proximate the front end of the body and the castor wheel is proximate the rear end of the body.

6. The vehicle according to claim 5, wherein the two rotatable carriers and the castor wheel are in a T-shaped arrangement.

7. The vehicle according to claim 1, wherein the at least one carrier is rotatable.

8. The vehicle according to claim 7, wherein the at least one carrier includes at least one wheel.

9. The vehicle according to claim 1, wherein the steering device includes a longitudinal shaft attached to the body and rotatable about its longitudinal axis, a handle attached to the shaft adapted to rotate the shaft about its longitudinal axis.

10. The vehicle according to claim 9, wherein the longitudinal shaft is vertically movable with respect to the body.

11. The vehicle according to claim 9, wherein the handle is attached to the shaft proximate the rear end of the body and is adapted to be operated from behind the vehicle.

12. The vehicle according to claim 9, wherein the handle is attached to the shaft proximate the front end of the body.

13. The vehicle according to claim 12, wherein the at least one wheel is attached to the shaft and the at least one castor wheel is attached to one of the shaft and the handle.

14. The vehicle according to claim 9, wherein the handle is a generally upwardly extending shaft including a cross-bar proximate an upper end.

15. The vehicle according to claim 9, wherein the handle includes one of a joystick and a steering wheel.

16. The vehicle according to claim 1, wherein the vehicle is a cart including at least one seat adapted to carry a passenger.

17. The vehicle according to claim 1, wherein the vehicle is a trolley including a flat surface for carrying goods.

18. The vehicle according to claim 1, wherein the vehicle further includes propulsion means.

19. The vehicle according to claim 18, wherein the propulsion means includes one or more of a motor, a jigger, and a chain and crank.

20. The vehicle according to claim 9, wherein the at least one wheel and the at least one castor wheel are attached to the longitudinal shaft.

21. The vehicle according to claim 4, wherein the two rotatable carriers and the castor wheel are in a T-shaped arrangement.

22. A vehicle comprising a load-bearing body having a front end and a rear end, at least one carrier supporting the body on a surface on which the vehicle is positioned, and a steering device including at least one wheel and at least one castor tiltable about a longitudinal axis of the body, such that in use, the at least one wheel and the at least one castor contact a support surface and the vehicle is steerable by tilting the at least one castor and the at least one wheel about the longitudinal axis.

* * * * *